US009217665B2

(12) United States Patent
Santori et al.

(10) Patent No.: US 9,217,665 B2
(45) Date of Patent: Dec. 22, 2015

(54) VIEWING-ANGLE IMAGING USING LENSLET ARRAY

(71) Applicant: HEWLETT-PACKARD DEVELOPMENT COMPANY, L.P., Houston, TX (US)

(72) Inventors: Charles M. Santori, Palo Alto, CA (US); Kelley Elise Rivoire, Palo Alto, CA (US); David A. Fattal, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 338 days.

(21) Appl. No.: 13/755,582

(22) Filed: Jan. 31, 2013

(65) Prior Publication Data

US 2014/0209821 A1 Jul. 31, 2014

(51) Int. Cl.
*H01J 5/16* (2006.01)
*G01J 1/04* (2006.01)
*G02B 21/36* (2006.01)

(52) U.S. Cl.
CPC ............. *G01J 1/0407* (2013.01); *G01J 1/0411* (2013.01); *G02B 21/365* (2013.01)

(58) Field of Classification Search
CPC ..... G01J 1/0407; G01J 1/0411; G02B 21/365
USPC .......................................... 250/216; 348/348
See application file for complete search history.

(56) References Cited

U.S. PATENT DOCUMENTS

| 7,557,929 | B2 | 7/2009 | Fang-Yen et al. |
| 7,723,662 | B2 | 5/2010 | Levoy |
| 7,872,796 | B2 * | 1/2011 | Georgiev ...................... 359/368 |
| 7,936,392 | B2 | 5/2011 | Ng |
| 7,965,936 | B2 | 6/2011 | Raskar |
| 2009/0096783 | A1 | 4/2009 | Shpunt et al. |
| 2009/0225644 | A1 | 9/2009 | Takashima et al. |
| 2010/0276573 | A1 | 11/2010 | Duerksen |
| 2014/0267674 | A1 * | 9/2014 | Mertz et al. ..................... 348/79 |

OTHER PUBLICATIONS

Mertz et al., Partitioned Aperture Wavefront Imaging Method and System, U.S. Appl. No. 61/675,113, filed Jul. 24, 2012.*
Levoy, M. et al., "Recording and Controlling the 4D Light Field in a Microscope Using Microlens Arrays", 2009 Journal compilation, The Royal Microscopial Society, vol. 235, Pt 2 2009, pp. 144-162.

\* cited by examiner

*Primary Examiner* — Thanh Luu
(74) *Attorney, Agent, or Firm* — Dhand Law PC

(57) ABSTRACT

An example apparatus may include a light source for illuminating a sample, an objective lens positioned on a light path extending from the sample, a lenslet array having a plurality of lenslets and positioned along the light path to receive light from the objective lens. The lenslet array may be positioned along the light path at substantially a Fourier plane of the sample. The example apparatus may also include a detector positioned along the light path approximately one lenslet focal length from the lenslet array. The plurality of lenslets of the lenslet array may correspond to portions of the detector. Each lenslet of the lenslet array may transmit to a corresponding portion of the detector an image of the same portion of the sample from a different viewing angle.

14 Claims, 4 Drawing Sheets

VIEWING-ANGLE IMAGING USING LENSLET ARRAY

BACKGROUND

Light-field technology may be used to capture three-dimensional information about an object. The collected data can be used to obtain a set of images, such as images at different focal planes.

BRIEF DESCRIPTION OF THE DRAWINGS

For a more complete understanding of examples of the present invention, reference is now made to the following descriptions taken in connection with the accompanying drawings in which.

DETAILED DESCRIPTION

In various examples, a light-field device, such as a microscope or a camera, can be used to generate images of an object from varying viewing angles. In accordance with disclosed examples, a lenslet array is positioned at substantially a Fourier plane of a sample. The lenslet array forms an array of separate images on a sensor array, each image corresponding to a different viewing angle.

Figure 1:
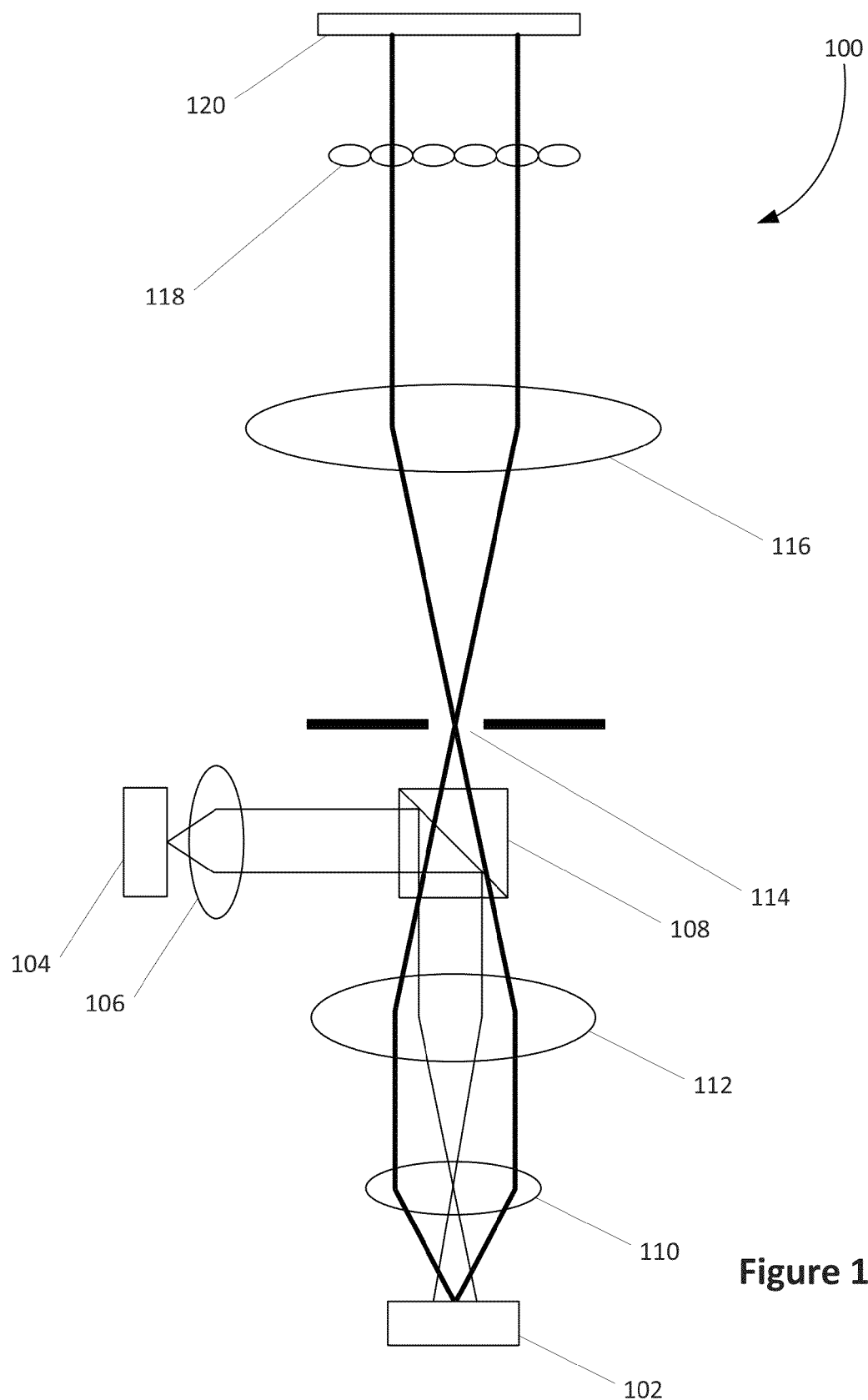
FIG. 1 is a schematic illustration of an apparatus in accordance with an example, including a lenslet layer.

FIG. 1 provides a schematic illustration of an example of an apparatus in accordance with an example. The example apparatus 100 of FIG. 1 may be a microscope or other imaging device, such as a camera, for example. The example apparatus 100 is configured to illuminate a sample 102 to be imaged with a light source 104. In various examples, the light source 104 may include one or more light-emitting diodes (LEDs). In other examples, the light source 104 may include other types of suitable light sources. The light from the light source 104 is directed through an illumination objective lens 106 to a reflector (or beamsplitter) 108. The illumination objective lens 106 may form substantially parallel light rays, which are reflected by the reflector 108 to the sample 102. Thus, the sample 102 may have reflective illumination.

Light from the sample 102 may be directed along a light path to a detector 120. In various examples, the detector 120 may be a detector array having a plurality of detector elements configured to form an image. In various examples, each detector element of the detector 120 corresponds to a pixel in the image. In various examples, the detector 120 may be an array of charge-coupled device (CCD) detectors or an array of complementary metal-oxide semiconductor (CMOS) detectors. Of course, various other types of detectors may be used in various examples.

In the illustrated example of FIG. 1, light from the sample 102 passes through an objective lens 110 positioned along the light path. In various examples, the objective lens 110 is an infinity-corrected objective lens which generates a parallel light beam. The parallel light beam may be directed to an image-forming lens 112. In various examples, the image-forming lens 112 is positioned at approximately one focal length of the image-forming lens 112 from the back focal plane of the objective lens 110.

An aperture 114 may be positioned substantially at the image plane (e.g., approximately one focal length of the image-forming lens 112 from the image-forming lens 112). The aperture 114 may help define the field of view for the detector 120.

Light passing through the aperture 114 then passes through a re-collimating lens 116. In various examples, the re-collimating lens 116 is positioned at approximately one focal length of the re-collimating lens 116 from the aperture 114. The re-collimating lens 116 produces a substantially parallel light beam.

The combination of the image forming lens 112 and the re-collimating lens 116 allows for control over the magnification of the image of the sample 102 onto the detector 120. This combination also allows the size of the beam to be matched to the size of the detector array. In various examples, the magnification may be 1.5×, 2× or any appropriate or desired magnification.

A lenslet array 118 is positioned between the re-collimating lens 116 and the detector 120. As noted below, in various examples, the lenslet array is positioned substantially at a Fourier plane of the sample 102. Further, the lenslet array 118 may be positioned at a distance from the detector 120 that is approximately equal to the focal length of the lenslets in the lenslet array 118. In various examples, the lenslet array 118 is a two-dimensional array of lenslets, such as microlenses. The lenslets and the lenslet array 118 may vary in size and shape in various examples. In one example, the lenslet array 118 includes lenslets that have a pitch of 0.8 mm and a focal length of 7.5 mm.

In various examples, the lenslet array 118 is positioned substantially at a Fourier plane of the sample 102. In this regard, in the example of FIG. 1, the lenslet array is positioned such that the distance between the re-collimating lens 116 and the lenslet array 118 is approximately the focal length of the re-collimating lens 116 (e.g., a Fourier plane of the sample 102 and the aperture 114). In various examples, positioning the lenslet array 118 at the Fourier plane (e.g., approximately one focal length from the re-collimating lens 116) produces certain desirable results. For example, in this configuration, different parts of the beam correspond to different viewing angles of the sample 102. Further, the various sub-images corresponding to the different viewing angles are centered at substantially the same portion of the sample.

As described in greater detail below with reference to FIG. 3, positioning the lenslet array 118 at or near a Fourier plane of the sample (or of the aperture) allows each lenslet of the lenslet array 118 to generate a separate image of the sample 102 onto the detector 120. The separate image generated from each lenslet of the lenslet array 118 may correspond to an image of the sample for a different viewing angle. In various examples, the viewing angle of each separate image depends on the position of the corresponding lenslet within the lenslet array 118.

In one example, an objective lens may be placed at a distance from the sample 102 of one focal length of the objective lens. The Fourier plane of the sample would occur one focal length of the objective lens on the other side. For a compound lens system such as a microscope objective, the sample 102 is placed nearly at the front focal plane of the objective, while the distance from the sample 102 to the first surface of the objective lens 110 is approximately equal to the working distance of the objective lens. The first Fourier plane occurs at the back focal plane of the objective lens. Depending on the design of the objective lens, the back focal plane may occur either within or outside of the objective lens assembly. In one example, the image-forming lens 112 is placed so that its distance from the back focal plane of the objective lens 110 is approximately equal to the focal length of the image-forming lens 112. Similarly, another Fourier plane occurs relative to the image plane where the aperture 114 of FIG. 1 is positioned. In this regard, the re-collimating lens 116 may be positioned at a distance from the aperture 114 of approximately one focal length of the re-collimating lens 116. Thus, a Fourier plane of the sample 102 and the aperture 114 occurs on the other side of the re-collimating lens 116 at a distance of approximately one focal length of the re-collimating lens 116. In the example of FIG. 1, the lenslet array 118 is positioned at this Fourier plane.

Figure 2:
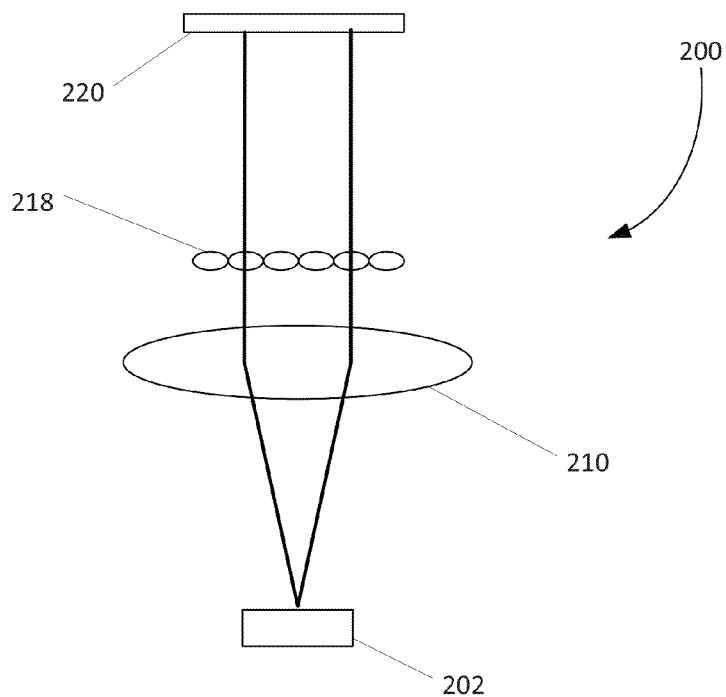
FIG. 2 is a schematic illustration of an apparatus in accordance with another example.

Referring now to FIG. 2, a schematic illustration of an example of an apparatus in accordance with another example is provided. Similar to the example apparatus 100 of FIG. 1, the example apparatus 200 of FIG. 2 may be a microscope or other imaging device, such as a camera, for example. The example apparatus 200 of FIG. 2 provides a compact device, such as a microscope. Unlike the example apparatus 100 of FIG. 1, the example apparatus of FIG. 2 does not include a reflective light source for the sample 202. Instead, a back light source (not shown) may be provided behind the sample 202, forming a light path going forward from the sample 202 to a detector 220.

As noted above, in various examples, the detector 220 may be a detector array having a plurality of detector elements configured to form an image. In various examples, the detector 220 may be an array of CCD detectors or an array of CMOS detectors. Of course, various other types of detectors may be used in various examples.

In the illustrated example of FIG. 2, light from the sample 202 passes through an objective lens 210 positioned along the light path. In various examples, the objective lens 210 may be an infinity-corrected objective lens which generates a parallel light beam.

As noted above with reference to the example apparatus 100 of FIG. 1, in various examples, a lenslet array 218 may be positioned at or near a Fourier plane relative to the sample 202. Further, the lenslet array 218 may be positioned at a distance from the detector 220 that is approximately equal to the focal length of the lenslets in the lenslet array 218. Thus, a separate image generated from each lenslet of the lenslet array 218 may correspond to an image of the sample for a different viewing angle. In various examples, the viewing angle of each separate image depends on the position of the corresponding lenslet within the lenslet array 218.

Figure 3:
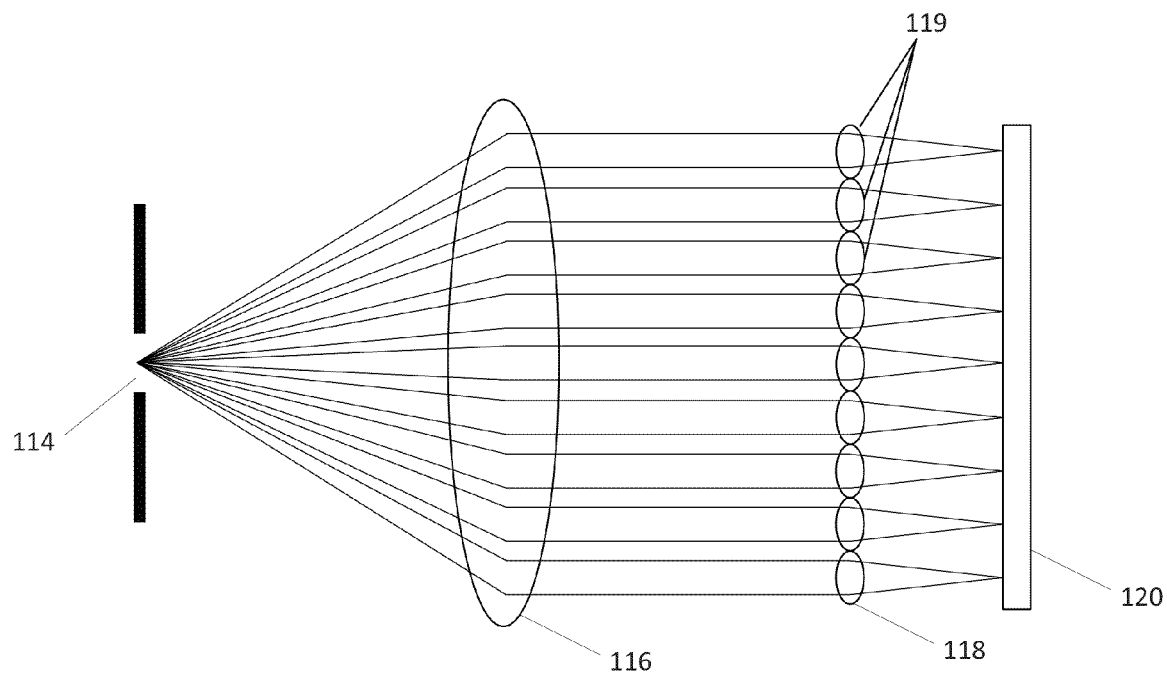
FIG. 3 is a schematic illustration of the lenslet array of FIG. 1.

Referring now to FIG. 3, a schematic illustration of the lenslet array 118 and a part of the apparatus 100 of FIG. 1 is provided. As illustrated in FIG. 3, light coming from the aperture 114 is directed through the re-collimating lens 116 and onto the lenslet array 118. In the example of FIG. 3, the lenslet array 118 includes a plurality of lenslets 119. The lenslet array 118 is positioned at substantially a Fourier plane of the aperture 114 (as well as of the sample), and it is placed approximately one lenslet focal length away from the detector 120 such that light from each lenslet 119 of the lenslet array 118 is focused onto the detector 120. Thus, each lenslet 119 of the lenslet array 118 may generate a separate image on the detector 120. The separate image generated from each lenslet 119 of the lenslet array 118 may correspond to an image of the sample for a different viewing angle. As noted above, in various examples, the viewing angle of each separate image depends on the position of the corresponding lenslet 119 within the lenslet array 118.

Figure 4:
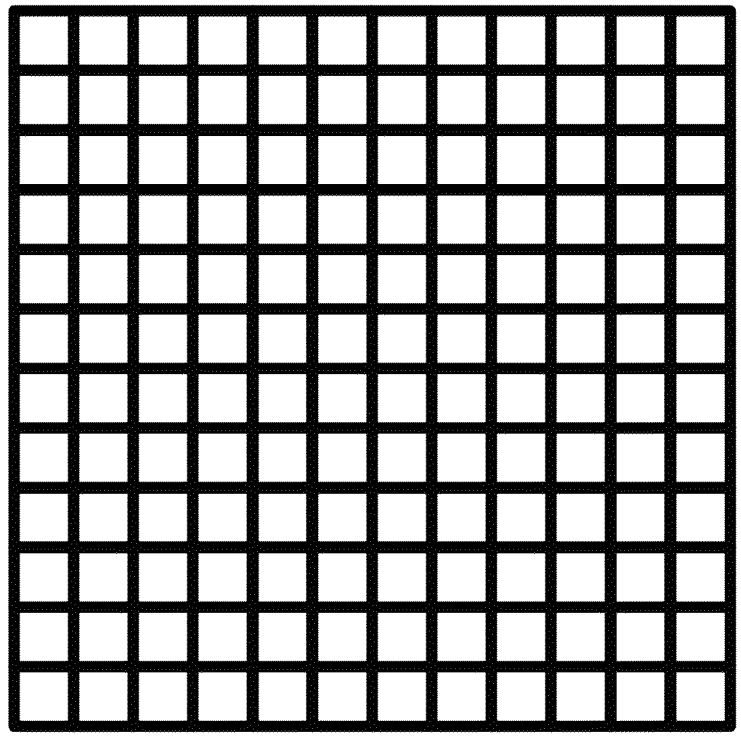
FIG. 4 illustrates a lenslet array configuration in accordance with an example.
Figure 5:
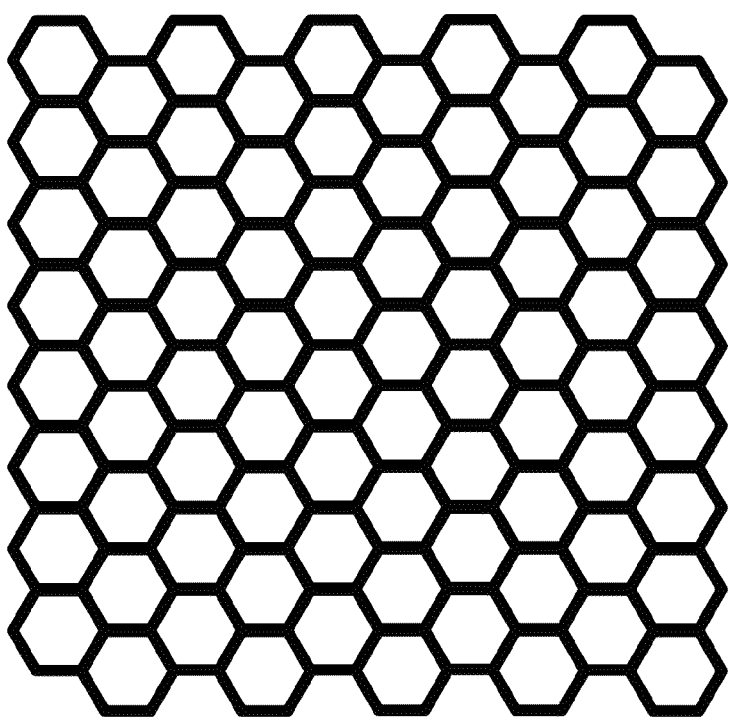
FIG. 5 illustrates a lenslet array configuration in accordance with another example.

The configuration of the lenslet array 119 may be selected to correspond to a selected viewing angle layout. In various examples, the viewing angle layout may be associated with a configuration of the detector 120, which may be an array of detector elements configured according to the desired layout. Or, the viewing angle layout may be chosen to produce images that can most easily be used by a multiview 3D display. In this regard, FIGS. 4 and 5 illustrate example lenslet array configurations. For example, FIG. 4 illustrates an example lenslet array 400 having a rectangular (e.g., square) viewing angle layout. In this example, each rectangle may represent a lenslet corresponding to a viewing angle. Similarly, FIG. 5 illustrates an example lenslet array 500 having a hexagonal viewing angle layout. In this example, each hexagon may represent a lenslet corresponding to a viewing angle. Various other viewing angle layouts are possible and contemplated within the scope of the present disclosure. In various examples, the size and shape of the aperture (e.g., the aperture 114 of FIG. 1) may be selected based on various factors. For example, for a lenslet array having a square viewing angle layout, the aperture 114 may be correspondingly square-shaped. Similarly, for a lenslet array having a hexagonal viewing angle layout, the aperture 114 may be correspondingly hexagonal-shaped to reduce unused lenslet array space.

Figure 6:
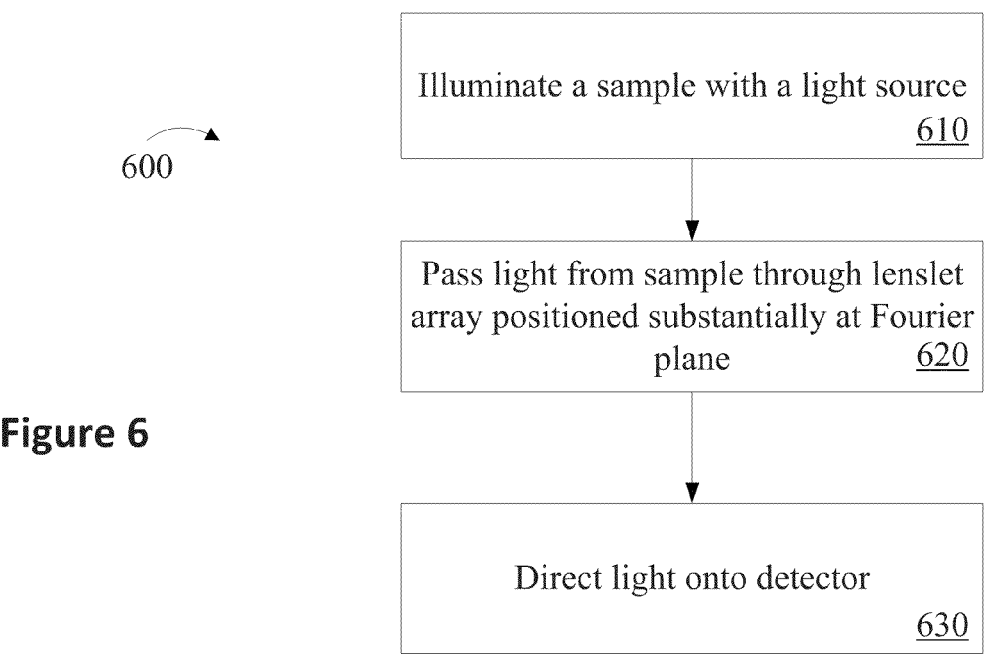
FIG. 6 is a flowchart illustrating a process in accordance with an example.

Referring now to FIG. 6, a flowchart illustrating an example process is provided. As illustrated in FIG. 6, the process 600 includes illuminating a sample with a light source (block 610). As described above with reference to FIGS. 1 and 2, the illumination may be a reflective illumination (e.g., FIG. 1) or back illumination (FIG. 2). Further, as also noted above, various types of light sources (e.g., LEDs) may be used for the illumination.

In various examples, the light from the sample may be passed through a lenslet array (block 620). As described above with reference to FIGS. 1 and 2, the light may pass through one or more lenses (e.g., objective lens) before passing through the lenslet array. Further, the lenslet array may include a plurality of lenslets and may be positioned along the light path to receive the light from the source. As noted above with reference to FIG. 3, the lenslet array may be positioned substantially at a Fourier plane relative to the sample, an image plane and/or an aperture.

Light from the plurality of lenslets of the lenslet array may be directed onto a detector or a detector array (block 630). As noted above, the detector or detector array may include CCD or CMOS detectors.

Figure 7:
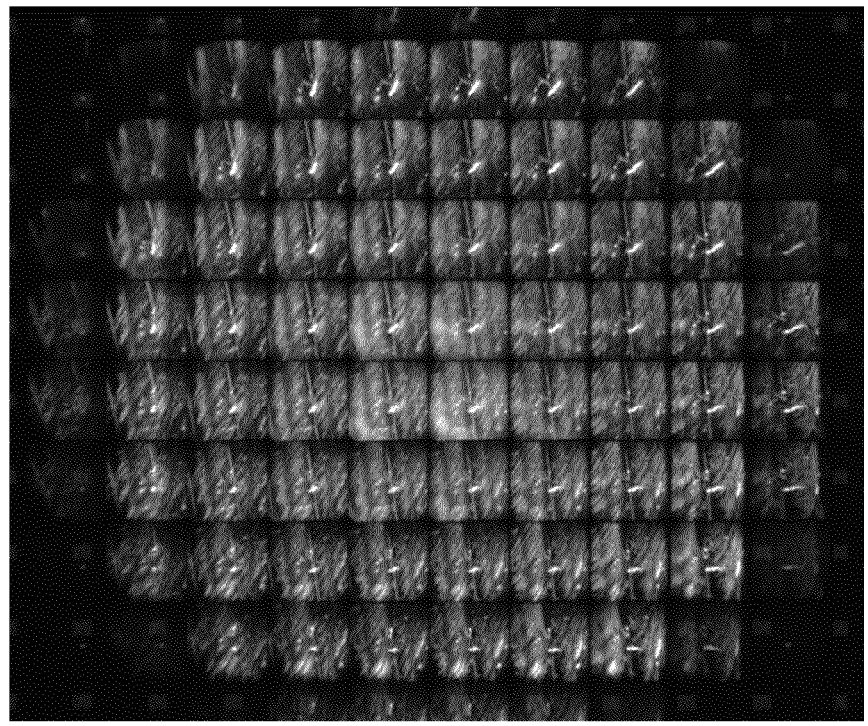
FIG. 7 illustrates an array of images in accordance with an example.

Thus, in accordance with various examples, an image may be formed on a detector for different viewing angles. An example of an array of images is provided in FIG. 7. As illustrated in FIG. 7, each image in the array of images corresponds to a different viewing angle of the same portion of a sample.

It should be understood that the various features, aspects and/or functionality described in one or more of the individual examples are not limited in their applicability to the particular example with which they are described, but instead can be applied, alone or in various combinations, to one or more of the other examples, whether or not such examples are described and whether or not such features, aspects and/or functionality are presented as being a part of a described example. Thus, the breadth and scope of the present disclosure should not be limited by any of the above-described exemplary examples.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. An apparatus, comprising:
a light source for illuminating a sample;
an objective lens positioned on a light path extending from the sample, wherein the objective lens is an infinity-corrected lens;
a lenslet array having a plurality of lenslets and positioned along the light path to receive light from the objective lens, the lenslet array being positioned along the light path at substantially a Fourier plane of the sample; and
a detector positioned along the light path approximately one lenslet focal length from the lenslet array,
wherein the plurality of lenslets of the lenslet array correspond to portions of the detector, and
wherein each lenslet of the lenslet array transmits to a corresponding portion of the detector an image of the same portion of the sample from a different viewing angle.

2. The apparatus of claim 1, wherein the lenslet array comprises an array of square-shaped lenslets or hexagon-shaped lenslets.

3. The apparatus of claim 1, wherein plurality of lenslets of the lenslet array and corresponding portions of the detector are both either square-shaped or hexagon-shaped.

4. The apparatus of claim 1, further comprising:
a reflector for directing light from the light source to the sample.

5. The apparatus of claim 1, further comprising:
an aperture positioned at an image plane, wherein the aperture allows light from the source to reach the plurality of lenslets.

6. The apparatus of claim 1, wherein the detector is a charge-coupled device (CCD) array or a complementary metal-oxide semiconductor (CMOS) array.

7. An imaging device, comprising:
an objective lens, the objective lens being an infinity-corrected lens;
a lenslet array receiving light from the objective lens and having a plurality of lenslets, the lenslet array being positioned substantially at a Fourier plane of the sample; and
a detector positioned substantially at one lenslet focal length from the lenslet array,
wherein each lenslet of the lenslet array transmits to the detector a different viewing angle of an image.

8. The imaging device of claim 7, wherein the plurality of lenslets of the lenslet array correspond to portions of the detector.

9. The imaging device of claim 7, wherein plurality of lenslets of the lenslet array and corresponding portions of the detector are both either square-shaped or hexagon-shaped.

10. The imaging device of claim 7, wherein the detector is a charge-coupled device (CCD) array or a complementary metal-oxide semiconductor (CMOS) array.

11. A method, comprising:
illuminating a sample with a light source;
passing light from the sample through an objective lens and a lenslet array, the objective lens being an infinity-corrected lens, the lenslet array having a plurality of lenslets and positioned along a light path to receive light from the objective lens, the lenslet array being positioned along the light path at substantially a Fourier plane of the sample; and
directing light from the lenslet array onto a detector positioned along the light path at approximately one lenslet focal length from the lenslet array,
wherein the plurality of lenslets of the lenslet array correspond to portions of the detector, and
wherein each lenslet of the lenslet array transmits to a corresponding portion of the detector an image of the same portion of the sample from a different viewing angle.

12. The method of claim 11, wherein the plurality of lenslets of the lenslet array correspond to portions of the detector.

13. The method of claim 11, wherein plurality of lenslets of the lenslet array and corresponding portions of the detector are both either square-shaped or hexagon-shaped.

14. The method of claim 11, wherein the detector is a charge-coupled device (CCD) array or a complementary metal-oxide semiconductor (CMOS) array.

* * * * *